(12) United States Patent
Leyendecker

(10) Patent No.: US 12,071,057 B2
(45) Date of Patent: Aug. 27, 2024

(54) COMFORT EQUIPMENT FOR A PUBLIC TRANSPORT VEHICLE, COMPRISING A CANTILEVER TABLE

(71) Applicant: ALSTOM HOLDINGS, St Ouen sur Seine (FR)

(72) Inventor: Nicolas Leyendecker, Drachenbronn-Birlenbach (FR)

(73) Assignee: ALSTOM Holdings

( * ) Notice: Subject to any disclaimer, the term of this patent is extended or adjusted under 35 U.S.C. 154(b) by 0 days.

(21) Appl. No.: 17/665,201

(22) Filed: Feb. 4, 2022

(65) Prior Publication Data
US 2022/0250521 A1    Aug. 11, 2022

(30) Foreign Application Priority Data

Feb. 5, 2021    (FR) ...................................... 21 01132

(51) Int. Cl.
*B60N 3/00*          (2006.01)
(52) U.S. Cl.
CPC .................................... *B60N 3/001* (2013.01)
(58) Field of Classification Search
CPC ........ B60N 3/001; B60N 3/002; B60N 3/007; B60N 3/026
USPC ..................................... 108/44, 45, 108, 152
See application file for complete search history.

(56) References Cited

U.S. PATENT DOCUMENTS

| | | | | | |
|---|---|---|---|---|---|
| 1,780,706 | A | * | 11/1930 | Goldbecher | ........... B60N 3/004 297/146 |
| 1,809,866 | A | * | 6/1931 | Riesche | ................... A47B 5/04 108/134 |
| 2,081,763 | A | * | 5/1937 | Peterson | ................. A47B 61/00 108/30 |
| 2,672,988 | A | * | 3/1954 | Johnson | ................. B60N 3/007 219/202 |
| 2,682,438 | A | * | 6/1954 | Davis | ..................... B60N 3/007 297/135 |
| 2,687,336 | A | * | 8/1954 | Smith | .................... B60N 3/004 108/34 |
| 2,718,874 | A | * | 9/1955 | Dunn | ..................... A01K 39/04 211/90.01 |
| 2,932,544 | A | * | 4/1960 | Lambert | ................ B60N 3/004 211/119.007 |

(Continued)

FOREIGN PATENT DOCUMENTS

| | | |
|---|---|---|
| DE | 10 2019 209 658 A1 | 1/2021 |
| EP | 3 456 603 A1 | 3/2019 |

OTHER PUBLICATIONS

French Search Report issued for French Patent Application No. 21 01132, Oct. 15, 2021 in 2 pages.

*Primary Examiner* — Jose V Chen
(74) *Attorney, Agent, or Firm* — Knobbe, Martens, Olson & Bear, LLP

(57) ABSTRACT

Comfort equipment includes a table support frame extending in a cantilevered manner in a transverse direction between a connecting end connected to a structure of the passenger cabin, and a free end. A support frame includes a first upright at its connecting end, a support crossbar connected to the first upright and extending parallel to the transverse direction, and a grip bar borne by the first upright and extending parallel to the transverse direction and above the support crossbar. The first upright includes at least one first upper fastener for fastening the first upright to the structure.

18 Claims, 4 Drawing Sheets

(56) References Cited

U.S. PATENT DOCUMENTS

| | | | | |
|---|---|---|---|---|
| 3,037,639 | A * | 6/1962 | Kost | B60N 3/007 |
| | | | | 224/482 |
| 5,046,433 | A * | 9/1991 | Kramer | B60N 3/004 |
| | | | | 297/188.06 |
| 5,370,060 | A * | 12/1994 | Wang | B60N 3/004 |
| | | | | 297/163 |
| 5,443,018 | A * | 8/1995 | Cromwell | B60N 3/004 |
| | | | | 108/44 |
| 7,658,153 | B1 * | 2/2010 | Patoka | B60R 11/00 |
| | | | | 108/46 |
| 7,739,964 | B2 * | 6/2010 | Hatton | F16M 13/02 |
| | | | | 108/135 |
| 2009/0078169 | A1 * | 3/2009 | Osborne | B61D 37/00 |
| | | | | 108/70 |
| 2010/0000449 | A1 * | 1/2010 | Botkin | A47G 25/06 |
| | | | | 248/222.12 |
| 2011/0162561 | A1 * | 7/2011 | Moronval | B61D 37/00 |
| | | | | 108/33 |
| 2016/0001885 | A1 * | 1/2016 | Curtis | B60N 3/004 |
| | | | | 108/77 |
| 2016/0039524 | A1 | 2/2016 | Zheng et al. | |
| 2019/0084461 | A1 * | 3/2019 | Le Corre | A47B 13/081 |

\* cited by examiner

COMFORT EQUIPMENT FOR A PUBLIC TRANSPORT VEHICLE, COMPRISING A CANTILEVER TABLE

CROSS-REFERENCE TO RELATED APPLICATION

This application claims priority to French Patent Application No. 21 01132 filed on Feb. 5, 2021, the disclosure of which including the specification, the drawings, and the claims is hereby incorporated by reference in its entirety.

FIELD OF THE INVENTION

The present invention relates to a comfort equipment for a public transport vehicle, comprising a cantilever table.

BACKGROUND OF THE INVENTION

Such a cantilever table is shaped so that a free space defined under this table is without a table leg, in particular to allow a person with reduced mobility to sit at the table in a comfortable manner, in particular without a table leg impeding a wheelchair or the legs of the person.

Such cantilever tables are already known from the prior art. However, such tables are generally unsatisfactory in that they have an arched side leg for mechanical strength, which reduces the amount of free space under the table.

SUMMARY OF THE INVENTION

One of the aims of the invention is to improve the situation by providing comfort equipment comprising a cantilever table, the volume of the free space defined under the table being optimised.

To this end, the invention has, in particular, the object of a comfort equipment for a passenger cabin of a public transport vehicle, comprising a table support frame extending in a cantilevered manner in a transverse direction perpendicular to a vertical direction, between a connecting end intended to be connected to a structure of the passenger cabin, and a free end, characterised in that:
the support frame has a first upright at its connecting end, a support crossbar connected to the first upright and extending parallel to the transverse direction, and a grip bar borne by the first upright and extending parallel to the transverse direction and above the support crossbar (15),
the first upright comprises at least one first upper fastener for fastening the first upright to the structure.

The first upright, originally intended to carry the support bar, is attached to the mounting plate above the support crossbar, so that the mechanical strength of the table is improved. This mechanical strength is then satisfactory for normal use of the comfort equipment, without the need for an arched side leg.

This makes it possible to use a side stand that takes up less space than in the prior art, or even not to use a stand at all, and thus to free up more space under the table.

A comfort equipment according to the invention may comprise one or more of the following features, taken alone or in any combination that is technically possible.

The comfort equipment comprises an intermediate fastening plate, intended to be fastened to the structure of the passenger cabin, each first upper fastener intended to be fastened to the intermediate plate, so that the first upright is indirectly fastened to the structure, through the intermediate fastening plate.

The comfort equipment comprises at least one second fastener for fastening the intermediate fastening plate to the structure of the passenger cabin, at least one of the at least one second fastener being a second upper fastener arranged above the grip bar in the vertical direction.

The comfort equipment comprises at least five second fasteners, including two lower second fasteners arranged in the vicinity of the support crossbar, two intermediate second fasteners arranged in the vertical direction between the support crossbar and the upper first fastener, and the upper second fastener.

The first upright has at least one first lower fastener arranged below the support crossbar in the vertical direction Z, preferably two first lower fasteners, advantageously arranged at substantially the same height in the vertical direction, for direct or indirect fastening to the structure.

The comfort equipment comprises two first upper fasteners, advantageously arranged at approximately the same height in the vertical direction.

Each first upper fastener is arranged, in the vertical direction, closer to the grip bar than to the supporting crossbar.

The comfort equipment is free, when attached to the structure of any element in a vertically defined free space between the support crossbar and a floor of the passenger cabin, the free space extending, in the transverse direction, over at least 85% of the dimension of the support frame in that transverse direction.

The comfort equipment comprises a support leg, which is intended to be attached to the structure of the cabin, and which carries the support frame at its connecting end at a lower height than the support frame in the vertical direction.

The support frame carries at least one table board, preferably two table boards, wherein each table board is preferably connected to the support crossbar in a fixed manner or by a pivot connection, and wherein each table board is preferably formed by two panels which are hinged to each other so as to be movable between a position in which they are folded onto each other and a deployed position in which one extends the other.

The invention also concerns a public transport vehicle, in particular a railway vehicle, comprising at least one passenger cabin comprising at least one structure, characterised in that it comprises at least one comfort element as defined above fastened to the structure.

BRIEF DESCRIPTION OF THE DRAWINGS

Other characteristics and advantages of the invention will be described in greater detail in the following description, given only as an illustrative, non-limiting example and referencing the attached drawings, in which.

DETAILED DESCRIPTION OF THE PREFERRED EMBODIMENTS

Figure 1:
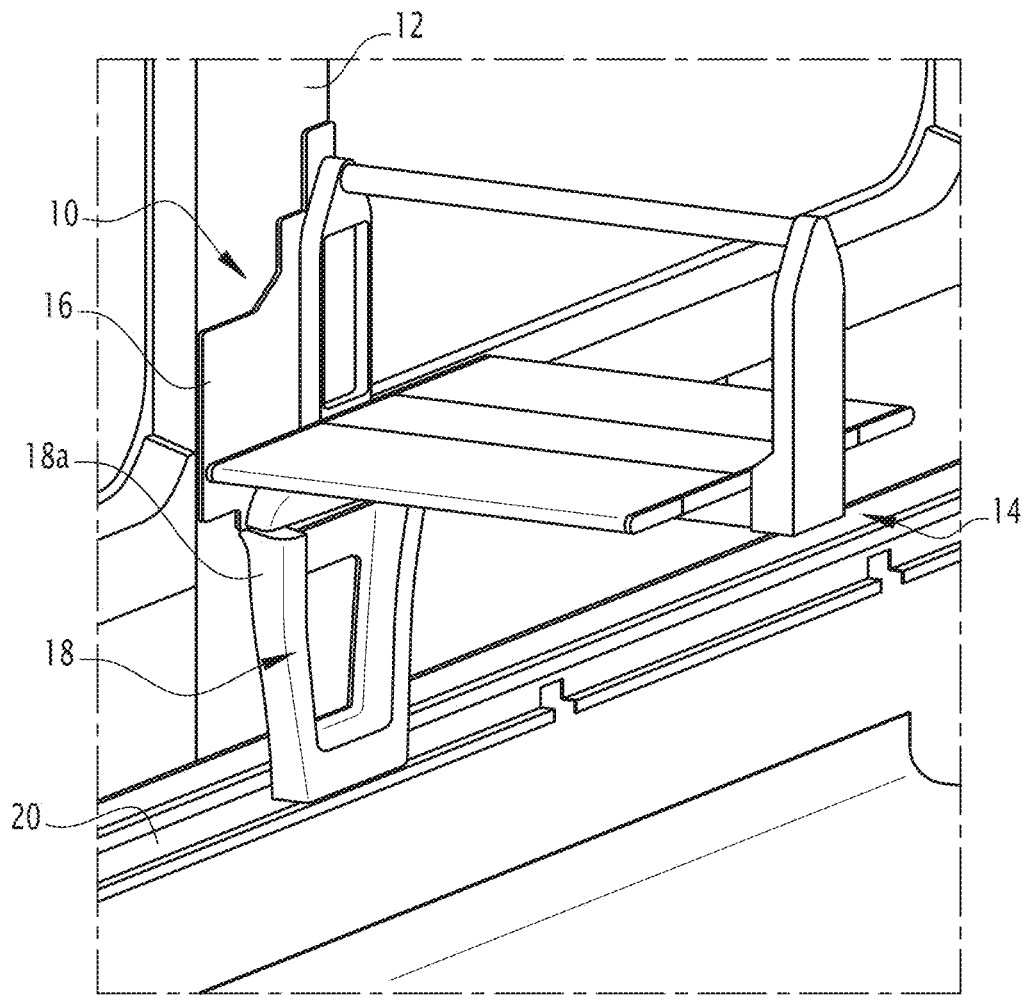
FIG. 1 is a perspective view of a comfort equipment according to one embodiment of the invention, equipping a public transport vehicle.
Figure 2:
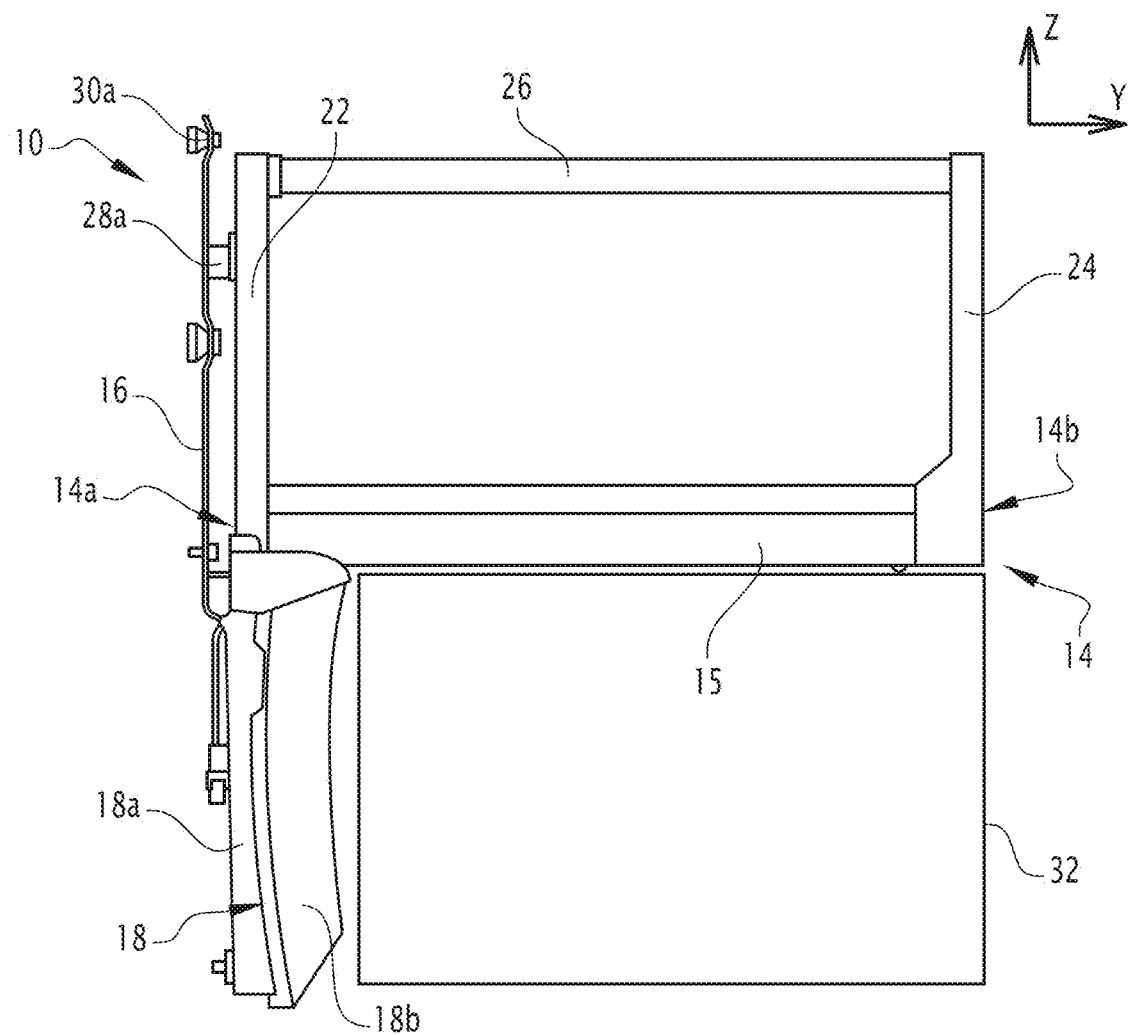
FIG. 2 is a side view of the comfort equipment of FIG. 1.

The figures show a comfort equipment 10 for a passenger cabin of a public transport vehicle, for example a railway vehicle.

In this description, a vertical direction Z is defined. The terms "top", "bottom", "upper" and "lower" have their usual meaning in this vertical direction Z.

The passenger cabin has at least one structure 12, in particular a structural side wall 12. A "structure" is a component of the vehicle's structure, i.e. one that is mechanically strong enough to support various other elements without deforming.

The comfort element 10 is intended to be borne by the structural side wall 12.

The comfort element 10 comprises a table support frame 14, extending in particular parallel to a transverse direction Y perpendicular to the vertical direction Z, between a connecting end 14a for connection to the structural side wall 12, and a free end 14b.

The support frame 14 has a support crossbar 15 extending parallel to the transverse direction Y, a first leg 22 connected to the support crossbar 15 at the connecting end 14a, and preferably a second leg 24 connected to the support crossbar 15 at the free end 14b. In particular, the first 22 and second 24 uprights extend parallel to the vertical direction Z.

Thus, the support beam 15 extends between the first 22 and second 24 uprights, in the vicinity of lower ends of those first 22 and second 24 uprights.

The support frame 14 also has a grip bar 26 extending parallel to the transverse direction Y between the first 22 and second 24 uprights above the support crossbar 15. The grip bar 26 is preferably connected to upper ends of the first 22 and second 24 uprights.

The connecting end 14a of the support frame 14 is attached to the structural side wall 12 either directly or via an intermediate fastening plate 16 and a support leg 18. The support leg 18 extends, parallel to the vertical direction Z, above a floor of the passenger cabin.

The first upright 22 is arranged above the support leg 18, in continuity with the support leg 18 in the vertical direction Z.

The intermediate fastening plate 16 has, in the example described, a generally flat shape, extending in a plane perpendicular to the transverse direction Y.

Alternatively, the intermediate fastening plate 16 could have at least one non-planar portion, or could have a number of planar portions, parallel or not, separated by shoulders.

The intermediate fastening plate 16 is made of a material that is sufficiently rigid and robust to hold the support frame 14, for example steel.

The support leg 18 has a structural part 18a, visible in FIG. 1, which is pressed against the structural wall 12 and is attached at its lower part to a fastening rail 20 which in turn is attached to the structural wall 12. The attachment of such a support leg 18 by means of a mounting rail is known per se.

The support leg 18 also has a trim part 18b covering the structural part 18a to conceal it. In one embodiment, the trim part 18b may comprise a waste bin.

Figure 3:
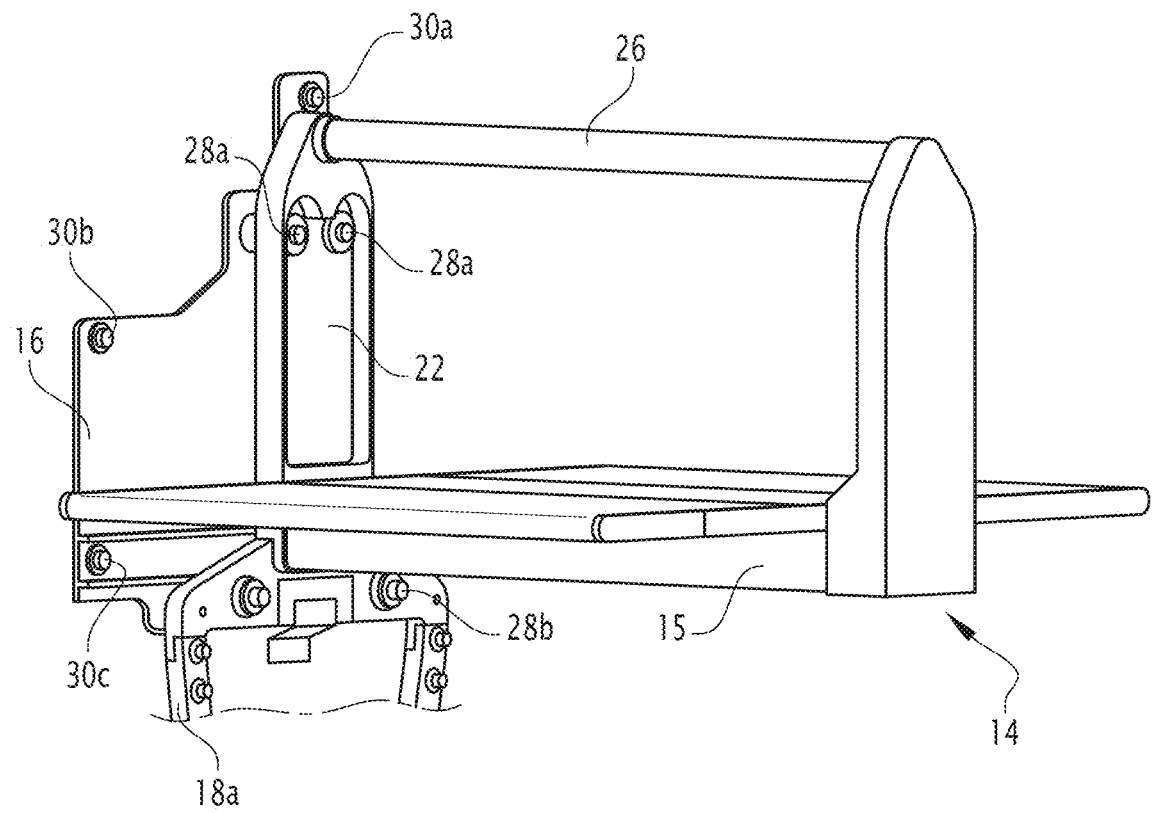
FIG. 3 is a perspective view of the comfort equipment of FIG. 1, shown in greater detail.
Figure 4:
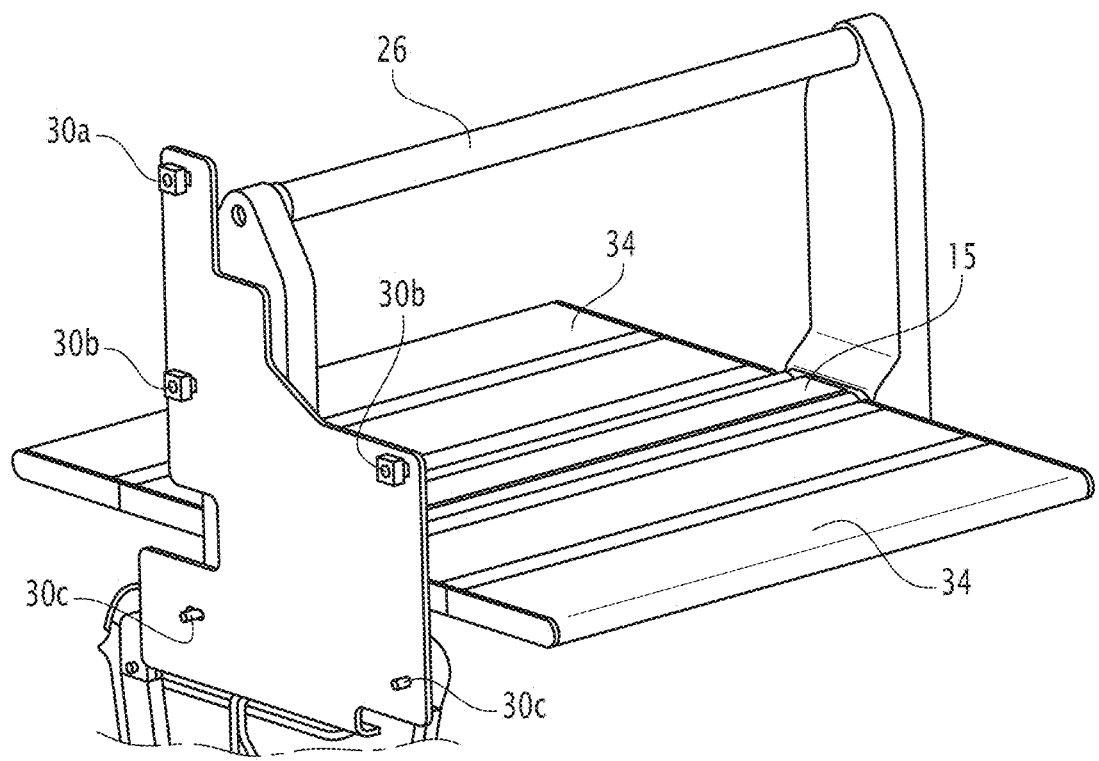
FIG. 4 is a perspective view of the comfort equipment of FIG. 1, shown from another angle.

As shown in particular in FIG. 3, the support leg 18, more particularly its structural part 18a, is fastened to the first upright 22, below the support crossbar 15, for example by screwing.

The first upright 22 is attached to the intermediate plate 16 by means of at least a first fastener 28a, 28b. More particularly, in the example described, the first upright 22 is attached to the intermediate plate 16 by means of at least a first upper fastener 28a and at least a first lower fastener 28b.

Each first fastener 28a, 28b is for example a screw with a threaded shank to be received in a tapped bore.

Each first upper fastener 28a is arranged, in the vertical direction Z, between the support beam 15 and the grip bar 26. In the example described, the support frame 14 has two first upper fasteners 28a, arranged at substantially the same height in the vertical direction Z, preferably close to the upper end of the first support 22.

Each first upper fastener 28a is arranged, in the vertical direction Z, closer to the grip bar 26 than to the support crossbar 15.

The first upper fastener(s) 28a, by securing the first support 22 at the top, effectively hold(s) the support frame 14. The lower fastener(s) 28b further enhance(s) the effectiveness of this holding of the support frame 14.

It should be noted that the comfort equipment 10 could alternatively comprise more first upper 28a and lower 28b fasteners.

Furthermore, each first lower fastener 28b is arranged, in the vertical direction Z, below the support crossbar 15. In the example described, the support frame 14 comprises two first lower fasteners 28b, arranged at substantially the same height in the vertical direction Z, preferably close to the upper end of the first support 22.

The intermediate fastening plate 16 is furthermore fastened to the structural side wall 12 by means of at least one second fastener 30a, 30b, 30c.

Each second fastener 30a, 30b, 30c is for example a screw with a threaded shank to be received in a tapped bore.

More particularly, in the example described, the comfort equipment 10 comprises at least one second upper fastener 30a, arranged, in the vertical direction Z, above each first upper fastener 28a. Preferably, each second upper fastener 30a is arranged, in the vertical direction Z, at a higher height than the grip bar 26.

The comfort equipment 10 furthermore comprises at least one second intermediate fastener 30b, arranged, in the vertical direction 2, between the support crossbar 25 and each first upper fastener 28a. For example, the comfort equipment 10 comprises two intermediate fasteners 30b, arranged at substantially the same height in the vertical direction Z, or at close heights. Preferably, each second intermediate fastener 30b is arranged, in the vertical direction Z, at a height close to that of the grip bar 15.

The comfort equipment 10 further comprises at least one second lower fastener 30c, arranged in the vertical direction 2 below the support crossbar 15. For example, the comfort equipment 10 comprises two lower fasteners 30c, arranged at substantially the same height in the vertical direction Z, or at close heights.

The invention allows, using the first support 22 initially intended to carry the grip bar 26, the comfort equipment 10 to be fastened in height by means of the first 28a and second 30a upper fasteners. These additional fastening points ensure the mechanical strength of the comfort equipment 10, without the need for an additional support leg. Furthermore, the invention means that the support leg 18 does not need to have an arched shape extending under the support crossbar 25.

As a result, the comfort equipment 10 is devoid of any elements in a free space 32 defined vertically between the support crossbar 25 and the passenger cabin floor. This free space 32 extends, in the transverse direction, over at least 85% of the dimension of the support frame 14 in this transverse direction Y, i.e. the distance, in the transverse direction Y, between the connecting end 14a and the free end 14b. In other words, the comfort equipment 10 cantilevers from the structural wall 12 above the floor. In case the comfort equipment 10 is without a support leg 18, the free space 32 extends over 100% of the dimension of the support frame 14 in the transverse direction Y.

It should be noted that the support frame 14 conventionally carries at least one table board 34, preferably two table boards 34.

Each table board is preferably connected to the support crossbar 15 by a pivot connection, and each table board is preferably formed by two panels hinged to each other so as to be movable between a position in which they are folded onto each other and a deployed position in which one extends the other. Alternatively, the table board is formed by one or more fastened horizontal boards. Such a table board formed by folding panels or by one or more fastened horizontal boards is known per se.

Thus, the comfort element 10 forms a table when the table boards 34 are extended, or securely mounted.

It should be noted that the invention is not limited to the previously described embodiment, but could have various complementary variants.

What is claimed is:

1. A comfort equipment configured to be equipped in a passenger cabin of a public transport vehicle, the comfort equipment comprising a table support frame extending in a cantilevered manner in a transverse direction perpendicular to a vertical direction, between a connecting end intended to be connected to a structural element of the passenger cabin, and a free end, wherein:
    the table support frame has a first upright at its connecting end, a support crossbar connected to the first upright and extending parallel to the transverse direction, and a grip bar borne by the first upright and extending parallel to the transverse direction and above the support crossbar,
    Wherein the comfort equipment comprises at least one first upper fastener configured to fasten the first upright to the structural element of the passenger cabin,
    wherein the comfort equipment further comprises a table board connected to the first upright, and the table board is configured to pivotally move around an axis parallel to the transverse direction to open.

2. The comfort equipment according to claim 1, comprising an intermediate fastening plate, intended to be fastened to the structural element of the passenger cabin, each first upper fastener intended to be fastened to the intermediate plate, so that the first upright is indirectly fastened to the structural element, through the intermediate fastening plate.

3. The comfort equipment according to claim 2, comprising at least one second fastener for fastening the intermediate fastening plate to the structural element of the passenger cabin, at least one of the at least one second fasteners being a second upper fastener arranged above the grip bar in the vertical direction.

4. The comfort equipment according to claim 1, wherein the first upright comprises at least one first lower fastener arranged below the support crossbar in the vertical direction, for direct or indirect fastening to the structural element.

5. The comfort equipment according to claim 4, wherein the first upright comprises two first lower fasteners.

6. The comfort equipment according to claim 5, wherein the two first lower fasteners are arranged at the same height in the vertical direction.

7. The comfort equipment according to claim 1, comprising two first upper fasteners, arranged at the same height in the vertical direction.

8. The comfort equipment according to claim 1, wherein each first upper fastener is arranged, in the vertical direction, closer to the grip bar than to the supporting crossbar.

9. The comfort equipment according to claim 1, the comfort equipment being free, when attached to the structural member, of any elements in a free space defined vertically between the support crossbar and a floor of the passenger cabin, the free space extending, in the transverse direction, over at least 85% of the dimension of the table support frame in that transverse direction.

10. The comfort equipment according to claim 1, comprising a support leg, intended to be fastened to the structural element of the cabin, and carrying the table support frame at its connecting end, at a height lower than that of this table support frame in the vertical direction.

11. A public transport vehicle, in particular a railway vehicle, comprising at least one passenger cabin comprising at least one structural element, wherein it comprises at least one comfort element according to claim 1, fastened to the structural element.

12. The comfort element according to claim 1, wherein the table support frame comprises a second upright connected to the support crossbar at the free end.

13. The comfort element according to claim 12, wherein the second upright extends parallel to the first upright.

14. The comfort element according to claim 13, wherein the grip bar is connected to upper ends of the first and second uprights.

15. The comfort equipment according to claim 1, wherein the comfort equipment does not have any element in a free space defined vertically between the support crossbar and a floor of the passenger cabin, and wherein the free space extends at least more than 85% of the length of the table support frame in the transverse direction between the connecting end and the free end.

16. A comfort equipment for a passenger cabin of a public transport vehicle, comprising a table support frame extending in a cantilevered manner in a transverse direction perpendicular to a vertical direction, between a connecting end intended to be connected to a structural element of the passenger cabin, and a free end, wherein:
    the table support frame has a first upright at its connecting end, a support crossbar connected to the first upright and extending parallel to the transverse direction, and a grip bar borne by the first upright and extending parallel to the transverse direction and above the support crossbar,
    the first upright comprises at least one first upper fastener configured to fasten the first upright to the structural element,
    and wherein the table support frame carries at least one table board, wherein each table board is connected to the support crossbar in a fixed manner or by a pivot connection.

17. The comfort equipment according to claim 16, wherein the table support frame carries two table boards.

18. The comfort equipment according to claim 16, wherein each table board is formed by two panels which are hinged to each other.

* * * * *

UNITED STATES PATENT AND TRADEMARK OFFICE
CERTIFICATE OF CORRECTION

PATENT NO. : 12,071,057 B2  
APPLICATION NO. : 17/665201  
DATED : August 27, 2024  
INVENTOR(S) : Nicolas Leyendecker Page 1 of 1

It is certified that error appears in the above-identified patent and that said Letters Patent is hereby corrected as shown below:

On the Title Page

Column 1 (Assignee), Line 1, delete "Holdings" and insert -- Holdings, Saint-Ouen-Sur-Seine (FR) --.

In the Claims

Column 5, Line 39, Claim 1, delete "Wherein" and insert -- wherein --.

Signed and Sealed this  
Eighth Day of April, 2025

Coke Morgan Stewart  
*Acting Director of the United States Patent and Trademark Office*